United States Patent
Laurenziani et al.

(10) Patent No.: US 9,232,074 B2
(45) Date of Patent: Jan. 5, 2016

(54) DEVICE FOR ACCESS TO THE INTERNET VIA A MOBILE COMMUNICATION NETWORK

(71) Applicant: Orange, Paris (FR)

(72) Inventors: Clement Laurenziani, Paris (FR); Jerome Augui, Meudon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/302,071

(22) Filed: Jun. 11, 2014

(65) Prior Publication Data

US 2014/0370934 A1    Dec. 18, 2014

(30) Foreign Application Priority Data

Jun. 12, 2013  (FR) ...................... 13 55449

(51) Int. Cl.
| | |
|---|---|
| *H04M 11/06* | (2006.01) |
| *H04L 12/28* | (2006.01) |
| *H04W 88/16* | (2009.01) |
| *H04W 4/00* | (2009.01) |

(52) U.S. Cl.
CPC ......... *H04M 11/066* (2013.01); *H04L 12/2856* (2013.01); *H04W 4/008* (2013.01); *H04W 88/16* (2013.01)

(58) Field of Classification Search
CPC ........................... H04M 11/066; H04W 88/16
USPC .......... 455/90.3, 128, 557, 559, 575.1, 575.6, 455/575.8
See application file for complete search history.

(56) References Cited

U.S. PATENT DOCUMENTS

| | | | |
|---|---|---|---|
| 7,530,823 B1 | 5/2009 | Thornton | |
| 2003/0211869 A1* | 11/2003 | Lee .................. | H04M 1/725 455/572 |
| 2004/0063464 A1* | 4/2004 | Akram ............. | H04W 52/0206 455/559 |
| 2006/0009698 A1* | 1/2006 | Banet et al. ................. | 600/485 |
| 2006/0268833 A1* | 11/2006 | Yardley ........................ | 370/352 |
| 2012/0052913 A1* | 3/2012 | Gottehrer ............. | G06F 1/1632 455/558 |
| 2012/0179615 A1* | 7/2012 | Tang et al. .................... | 705/318 |
| 2013/0129138 A1* | 5/2013 | Washington, Jr. ... | H04R 1/1033 381/384 |
| 2015/0133100 A1* | 5/2015 | Trajkovski ......... | G06F 13/4027 455/418 |
| 2015/0189059 A1* | 7/2015 | Shen ................. | H04M 1/0274 455/559 |

FOREIGN PATENT DOCUMENTS

AU       2012100603 A4    7/2012

OTHER PUBLICATIONS

Anonymous, "Longshine LCS-8156C1 USA Modem 56K", Nov. 11, 2010, XP055106414.

(Continued)

*Primary Examiner* — Cong Tran
(74) *Attorney, Agent, or Firm* — David D. Brush; Westman Champlin & Koehler, P.A.

(57) ABSTRACT

A device is provided to access the Internet via a mobile communication network, including a data processing module arranged in a casing and a flexible cable extending outside the casing and connected to the data processing module. The cable ends in a connector for connection of the device to an item of equipment. The casing includes at least one main engagement element for the connector. The casing is configured so that when the connector is engaged in the main engagement element, the cable forms a loop defining a space between the casing and the cable to hang the device.

10 Claims, 4 Drawing Sheets

(56) References Cited

OTHER PUBLICATIONS

Anonymous, "The Imation Micro-HD" Dec. 28, 2005, pp. 1-2, XP055106360.

European Search Report dated Sep. 22, 2014 for European Application No. EP 14172070.

French Search Report dated Mar. 10, 2014 for corresponding French Application No. 1355449, filed Jun. 12, 2013.

* cited by examiner

DEVICE FOR ACCESS TO THE INTERNET VIA A MOBILE COMMUNICATION NETWORK

GENERAL TECHNICAL FIELD

The present invention concerns a device to access the Internet via a mobile communication network.

STATE OF THE ART

Numerous devices are known for accessing the Internet via a mobile communication network. They enable a user to continue using the Internet whenever travelling.

These devices are commonly called « 3G/4G modem » (depending on the technology of the mobile communication network to which they connect) and are in the form of a casing of small size equipped with an internal antenna, a SIM card of a service provider of the mobile communication network, and having a connection interface with equipment (to which the device provides Internet access) typically a laptop computer.

This interface is most often a wire connection of USB type (« Universal Serial Bus» ), hence the name 3G/4G « dongle » often given to these devices, but it may also be a wireless Wi-Fi and/or Bluetooth connection. The modem generally accumulates several types of connectivity.

Wireless connection offers numerous advantages. In particular Internet access can first be provided to a plurality of items of equipment and secondly the mean range of Wi-Fi or Bluetooth means that it is possible to position the device at a distance at a point where reception of the wireless communication is best (e.g. in a high place, away from any metal object, etc.).

USB connectivity on the other hand requires the presence of a short cable ending in a male USB port. When the modem is switched off or used without a wire this cable is aesthetically not very pleasing and even hampers tidy storage.

Modems are known in which the cable is removable which solves the aforementioned drawbacks but adds the risk of losing the cable insofar as it must not be forgotten when carrying the modem.

The invention improves the situation.

PRESENTATION OF THE INVENTION

The present invention relates to a device to access the Internet via a mobile communication network, comprising a data processing module arranged in a casing, a flexible cable extending outside the casing and connected to the data processing module, the cable ending in a connector for connection of the device to an item of equipment,
the device being characterized in that the casing comprises at least one main engagement element for the connector, the casing and the cable being configured so that when the connector is engaged in the main engagement element the cable forms a loop defining a space between the casing and the cable to hang the device.

With the present device it is therefore possible to use the USB cable as means for hanging the device when no wire connection is used. This makes it possible both to improve the quality of reception of the network (since it becomes possible to hang the device where the network is best) and to solve the problem of an untidy cable when not in use.

According to other advantageous non-limiting characteristics:

the casing further comprises an auxiliary engagement element for the connector, the casing being configured so that when the connector is engaged in the auxiliary engagement element the cable follows the contour of the device.
The main and auxiliary engagement elements allow two alternative positions of the cable, of which one in which there is no longer any loop for easy storage and transport;
the casing on its contour comprises a groove configured to receive the cable when the connector is engaged in the auxiliary engagement element.
The groove allows the cable to disappear completely into the storage position, for further improved pleasing aspect;
the casing comprises opposite-facing first and second surfaces the cable extending outside the casing from the first surface, and each engagement element being arranged on the second surface.
This arrangement corresponds to a parallelepiped structure of the casing, the most natural and best adapted structure for compact housing of the components;
the cable extends tangentially from the first surface.
Therefore the loop is in the form of a semi-ellipse whose axis is the upper surface of the casing, for easy hanging;
each engagement element consists of a cavity whose shape matches the shape of the connector in which the connector is engaged by translation.
Said cavity allows the connector to disappear completely inside the casing when it is engaged, to provide protection thereof;
the direction in which the connector is engaged in each engagement element is substantially orthogonal to a direction in which the connector is able to engage in a port of an item of equipment for connection.
This direction first allows the cable to extend tangentially to the second surface and secondly makes it impossible for the connector to be damaged even if the engagement element suffers an impact;
the cable comprises a grasping tab; Therefore the connector can be extracted from the engagement element even if it is completely pushed in and inaccessible;
the tab is a flexible element free in translation along the cable. This prevents the tab itself from being damaged although it projects outwardly;
the device further comprises a display on the casing, dynamically displaying an indicator of quality of reception of the mobile communication network.
With this indicator it is possible easily to find the best point for hanging the device 1 by moving in space;
the device further comprises wireless connection means connected to the data processing module for wireless connection of the device to an item of equipment;
The wireless means (typically Wi-Fi) allow a remote connection to one and even several items of equipment.

PRESENTATION OF THE FIGURES

Other characteristics and advantages of the present invention will become apparent on reading the following description of a preferred embodiment. This description is given with reference to the appended drawings in which.

DETAILED DESCRIPTION

Inner Architecture

Figure 1:
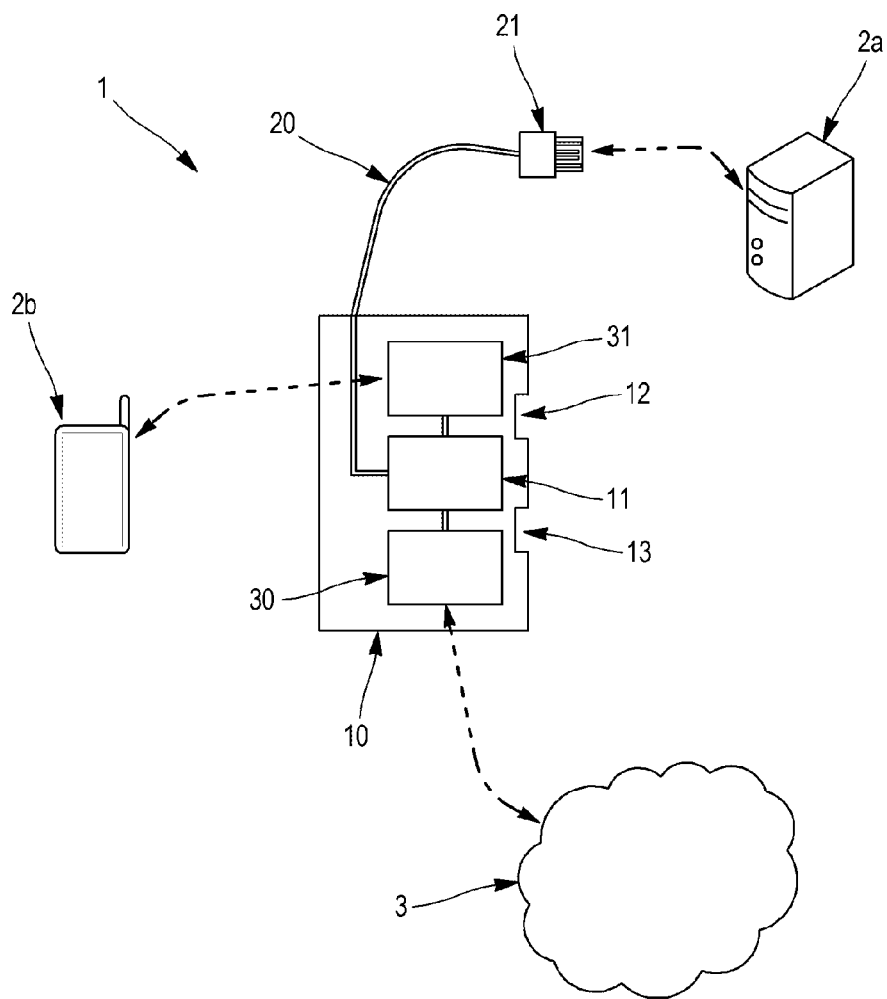
FIG. 1 illustrates an advantageous embodiment of a device of the invention.

The architecture of the present device 1 to access the Internet via a mobile communication network 3 is illustrated in FIG. 1.

As explained in the foregoing, this device 1 connects first to a mobile communication network 3, typically a mobile telephone network of 3G or 4G type connected to the Internet (it will be appreciated however that the invention is not limited to any type of mobile communication network) and secondly to one or more items of equipment 2a, 2b, which it will provide with an Internet access.

The device 1 comprises a casing 10, which may of many shapes but is advantageously substantially of parallelepiped shape for the reasons given below. This casing 10, in plastic for example houses the electronic components of the device 1.

These include a data processing module 11, a first wireless connection module 30 and advantageously a second wireless connection module 31. A battery may also be present (the cable 20 described below provides a power supply but an inner energy source is necessary for wireless operation).

The data processing module 11, in the form of a processor for example ensures the modem functions of the device 1.

The first wireless connection module 30 allows connection to the mobile communication network 3, and in particular receives a SIM card (Subscriber Identity Module) of a service provider of the mobile communication network 3.

This wireless connection module 30 is connected to the data processing module 11, which itself is connected to a cable 20 which extends outside the casing 10 and ends in a connector 21 for connection of the device 1 to an item of equipment 2a. As will be seen below this cable 20 is flexible.

By connector 21 is meant a standardised male plug (in particular conforming to the USB standard mentioned previously, but other standards such as RJ45 or IEEE1394 can be envisaged), adapted to engage in a compatible female port of the equipment 2a, 2b. When the connector 21 is plugged in (engaged in the port of the equipment 2a, 2b), the data processing module 11 routes the packets exchanged between the mobile communication network 3 and the equipment 2a, 2b.

The second wireless connection module 31 (which may optionally partly merge with the first wireless connection module 30 e.g. by sharing its antenna) offers an alternative to the wire connection via the cable 30. In the remainder of this description the example of a Wi-Fi connection module will be used, but it will be appreciated that the invention is not limited to this technology (Bluetooth for example being a possible technology).

In FIG. 1, the equipment 2a is a work station of PC type connected to the device 1 via the cable 20, and the item of equipment 2b is a terminal of smartphone type connected to the device 1 by Wi-Fi. The two connections may be alternate or simultaneous.

In general it will be appreciated that is within the reach of persons skilled in the art to adapt the inner components of the casing 10 in relation to the intended use of the device 1.

Outer Architecture—Wi-Fi Position

Figure 2A:
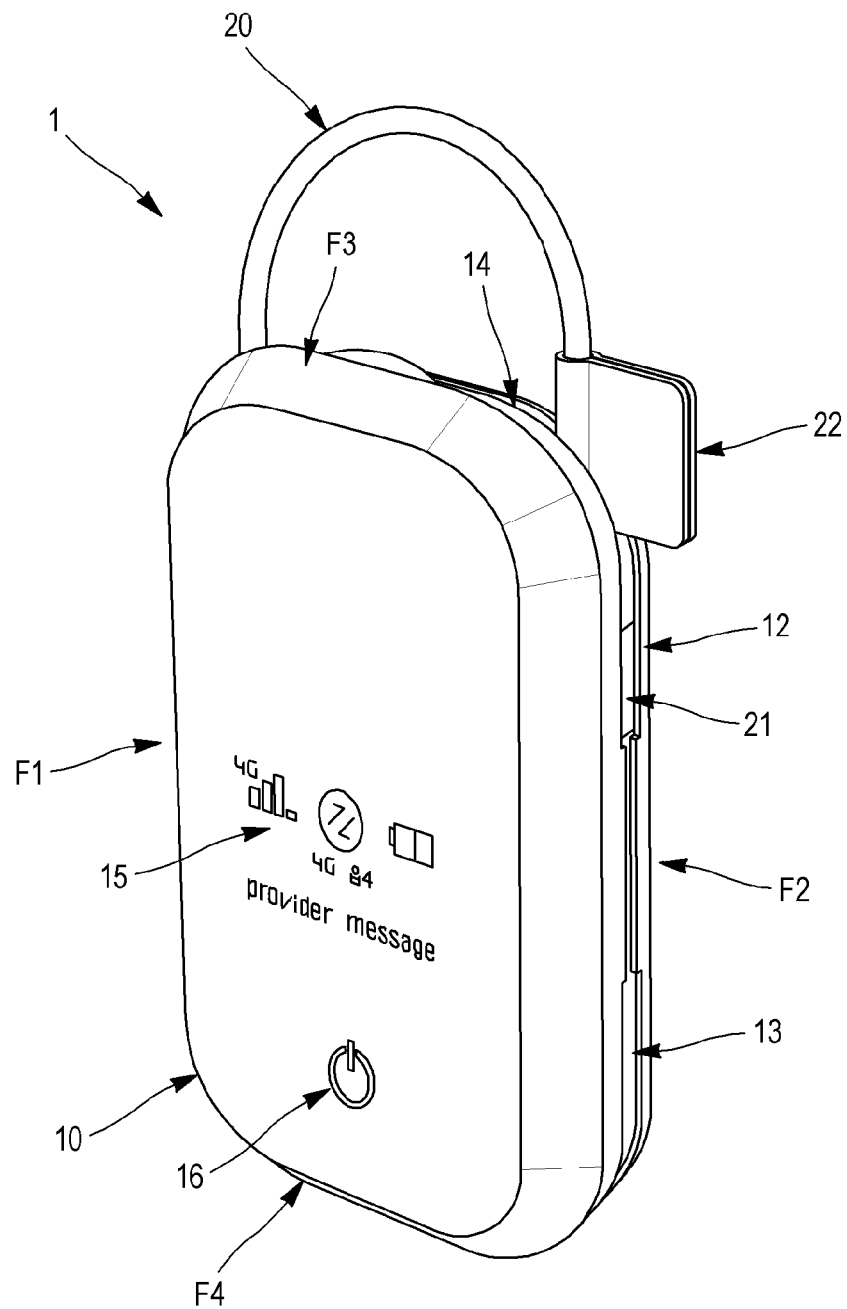
FIGS. 2a-2b are two views of one advantageous embodiment of the device of the invention, in the two positions respectively.

The device 1 is characterized in that it comprises a main engagement element 12 for the connector 21 illustrated in FIG. 1, but the specificity thereof is more clearly seen in FIG. 2a.

The casing 10 and the cable 20 are effectively configured so that when the connector 21 is engaged in the main engagement element 12, the cable 20 forms a loop defining a space between the casing 10 and the cable 20 to hang the device 1.

Figure 3A:
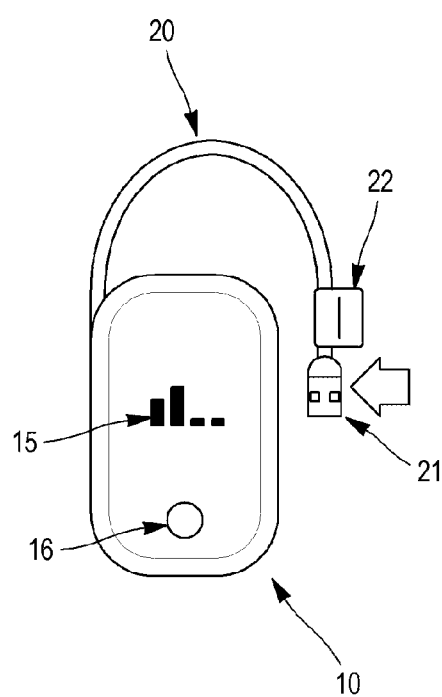
FIGS. 3a-3b illustrate the placing of the device of the invention in Wi-Fi position.
Figure 3B:
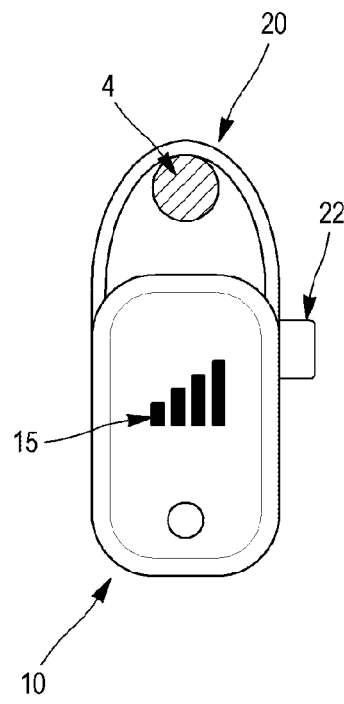

The use of the loop is particularly apparent in FIGS. 3a and 3b, wherein element 4 can be seen which may be any protuberance on which the top of the loop can rest. This may be a nail in a wall, the bar of an item of furniture or window handle, etc. Such hanging allows the device 1 to be placed in a vertical position but more especially improves Quality of Service (QoS), making it possible easily to place the device 1 at a point where reception of the mobile communication network 3 is the best (at a height, close to a window, etc.).

This position of the cable 20 corresponds to a « Wi-Fi position» , since it is adapted for functioning of the device by wireless connection (typically Wi-Fi) with the item(s) of equipment 2a, 2b via the second module 31. In this functioning mode, the device does not need to be in the immediate vicinity of the equipment 2a, 2b, and it is advantageous to position the device 1 astutely to optimise the quality of reception of the network 3.

As can be seen in FIG. 2a, one surface of the casing 10 may comprise a display 15 dynamically showing the quality of reception of the network 3 via display of an indicator.

The quality indicator here is in the form of bars: the greater the number of bars the better the received signal. This facilitates the search for the optimal position of the device 1. The display 15 may also show the battery level of the device 1 and whether the Wi-Fi connection module 31 is activated. A button 16 allows switching on/off of the device 1 and optionally activation/deactivation of the Wi-Fi module 31 (for example by two quick presses on this button 16).

The shape of the loop is defined by three parameters: the position of the point on the casing 10 from which the cable 20 extends; the position of the main engagement element 12; and the length of the cable 20.

If the casing 10 is parallelepiped it comprises a first surface F1 and a second surface F2 opposite one another (which correspond to the left and right surfaces in FIG. 2a). The cable 20 extends outside the casing 10 from the first surface F1, and the engagement element 12 is arranged on the second surface F2.

In this configuration, the condition for the casing 10 to be configured so that the cable forms a loop defining a space between the casing and the cable to hang the device is then that the length of the cable 20 should be substantially longer than the distance between the two surfaces. More particularly by defining the upper surface of the casing as F3, the equation to be verified is (distance F3/cable attachment point)+(distance F3/main engagement element)+(distance F1/F2) >length of the cable.

It will be appreciated that persons skilled in the art, depending on the shape of the casing 10, will be able to adapt the position of that part of the casing 10 from which the 20 extends, the position of the main engagement element 12, and the length of the cable 20 to obtain the loop.

Outer Architecture—Storage Position

Figure 2B:
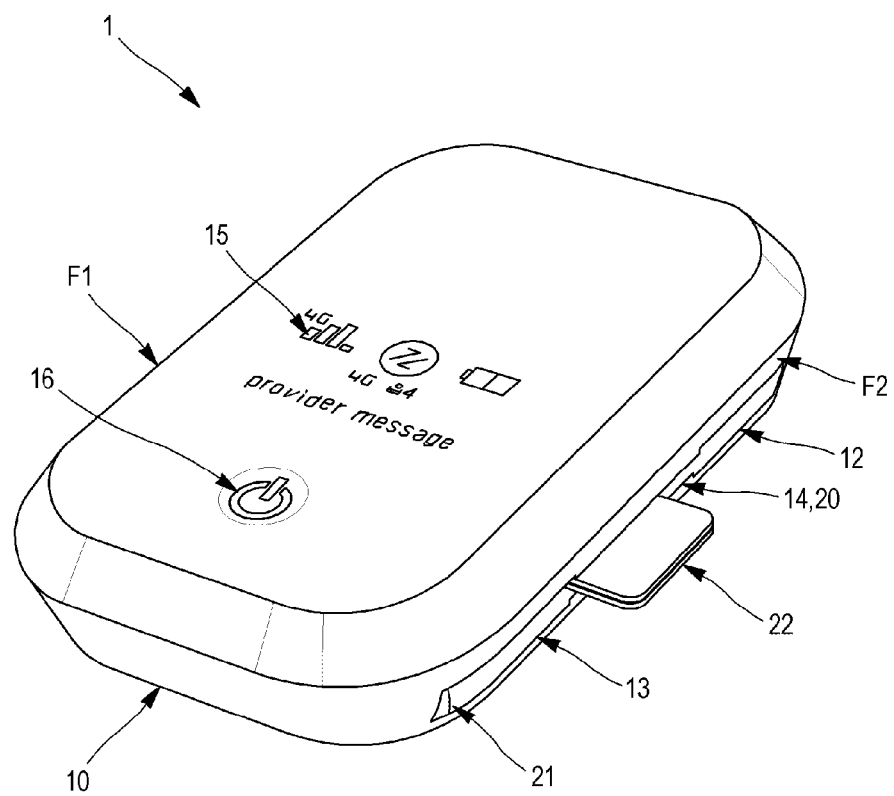

It is particularly preferred that the Wi-Fi position is the first position of the cable 20, the casing 10 being configured also to allow a second position of the cable 20 called « storage position» illustrated in FIG. 2b.

For this purpose the casing 10 further comprises an auxiliary engagement element 13 for the connector 21. The casing 10 and the cable 20 this time are configured so that when the connector 21 is engaged in the auxiliary engagement element 13, the cable 20 follows the contour of the device 1. In other words, the cable no longer forms a loop (there is no space between the casing 10 and the cable 20, or at least not enough to insert a hanging element) hence a more compact format, ideal for storage and transport.

More particularly if the casing 10 comprises a groove 14 on its contour, this groove receives the cable 20 when the connector 21 is engaged in the auxiliary engagement element 13 so that the cable 20 becomes invisible.

Since the cable 20 is flexible, it is possible to change over with ease from one position to the other, from Wi-Fi and storage position by deforming the cable 20.

In the preferred embodiment illustrated in the Figures, the auxiliary engagement element 13 is also arranged on the surface F2, passing over the top of the casing 10. This time the equation is about (distance F3/cable attachment point)+(distance F3/auxiliary engagement element)+(distance F1/F2) =length of cable.

In most cases the main and auxiliary engagement elements 12, 13 are aligned but separated by a distance equivalent to the length of «slack» in the loop, but it is to be noted that numerous other configurations are possible.

In particular it is not excluded that the main and auxiliary engagement elements 12, 13 merge if the casing 10 is configured so that there are two different arrangements of the cable 20 along the walls of the casing (for example one along the top side F3 and one along the bottom side F4 as can be seen in FIG. 2a) so that the cable 20 has the hanging loop in one arrangement and in the other it follows the wall.

It is to be noted that this storage position does not at all exclude functioning in Wi-Fi mode (FIG. 2b shows the device 1 switched on) although hanging of the device is not possible in this position.

Engagement Elements

The engagement elements 12, 13 may be any part able to removably receive the connector 21, the engaging being sufficiently strong so that it is possible to hang the device 1 by the cable 20 without risk of falling.

The maintained engaging is ensured by friction forces between the engagement element and the connector 21, but alternatively it is possible for example to use a clip-on connector.

As can be seen in the Figures, the engagement element(s) 12, 13 have a cavity matching the shape of the connector 21, the connector 21 engaging therein by translation. This is the simplest, most efficient and aesthetically pleasing means to obtain engaging.

However, contrary to the case with some hard disks however, the translation allowing engagement is not made in the direction in which the connector 21 can engage in a port of an item of equipment 2a, 2b for connection (in other words the axis of the connector 21).

On the contrary, the direction in which the connector 21 engages in the engagement element(s) 12, 13 is chosen to be different from the direction whereby the connector 21 engages in a port of an item of equipment 2a, 2b for connection, and may even be substantially orthogonal. This can be seen for example in FIG. 3a which illustrates the engaging direction.

This engaging direction that is at least partly «lateral» and not «longitudinal» has numerous advantages:
there is no risk that the connector 21 will become detached in the event of pulling on the cable 20 (since said pulling is along the axis of the connector 21, in other words in the direction in which the connector 21 can engage in a port). This is important when the device 1 is in hanging position and is hanging: should a traction force equal to its weight be applied to the cable 20, the device would fall (and would probably be damaged) if this traction causes detachment of the connector 21;
the cable 20 is tangent to the wall of the casing 10, facilitating the shape of the loop and improving its pleasing look;
there is no risk of twisting the connector 21 in the event of impact on the side of the casing 10 or of rather strong pulling on the loop of the cable 20;
the small depth of the required cavity facilitates inner organisation of the components;
the use of a tab 22 is made possible.

When the direction of engaging is orthogonal to the axis of the connector 21 (the direction in which the connector 21 can engage in a port) the above effects are maximal.

As can be seen in the Figures, the cable 20 comprises a grasping tab 22 arranged in the vicinity of the connector 21. This tab 22 offers a grasping surface extending orthogonally to the direction of the cable 20, in other words in the direction of engagement (and hence of disengagement) of the cable 20. Pulling on the tab therefore easily allows the connector 21 to be withdrawn from one of the engagement elements 12, 13.

This is most useful as an addition to the groove 14: the cable 20 and the connector 21 disappear completely inside surface F2 of the casing 10 and it is difficult to remove them by hand. The tab 22 protrudes and provides a grasping element.

This tab may be a sheet of flexible material (typically rubber) surrounding the cable 20 optionally free in translation along the cable 20. The flexibility of the tab 22 prevents any risk of breakage.

The invention claimed is:

1. A device to access the Internet via a mobile communication network, comprising:
   a data processing module arranged in a casing;
   a flexible cable extending outside the casing and linked to the data processing module, the cable ending in a connector configured to connect the device to an item of equipment,
   wherein the casing comprises at least one main engagement element for the connector, each engagement element comprising a cavity matching a shape of the connector, wherein the connector engages by translation differing from a direction in which the connector can engage in a port of an item of equipment for connection, the casing and the cable being configured so that when the connector is engaged in the main engagement element, the cable forms a loop defining a space between the casing and the cable to hang the device.

2. The device according to claim 1, wherein the casing further comprises an auxiliary engagement element for the connector, the casing and the cable being configured so that when the connector is engaged in the auxiliary engagement element, the cable follows a contour of the device.

3. The device according to claim 2, wherein the casing on its contour comprises a groove configured to receive the cable when the connector is engaged in the auxiliary engagement element.

4. The device according to claim 1, wherein the casing comprises a first and second opposite-facing surfaces, the cable extending outside the casing from the first surface, and each engagement element being arranged on the second surface.

5. The device according to claim 4, wherein the cable extends tangentially to the first surface.

6. The device according to claim 1, wherein the direction in which the connector engages in each engagement element is substantially orthogonal to the direction in which the connector can engage in a port of an item of equipment for connection.

7. The device according to claim 1, wherein the cable comprises a grasping tab.

8. The device according to claim 7, wherein the tab is a flexible element free in translation along the cable.

9. The device according to claim 1, further comprising a display on the casing, dynamically displaying an indicator of quality of reception of the mobile communication network.

10. The device according to claim 1, further comprising wireless connection means connected to the data processing module for wireless connection of the device to an item of equipment.

* * * * *